United States Patent Office 3,294,875
Patented Dec. 27, 1966

3,294,875
PHOSPHORIC ACID ESTERS, ESTER AMIDES OR ESTER DIAMIDES
Karl Mannes, Leverkusen, Karlfried Wedemeyer, Cologne-Stammheim, and Günter Unterstenhöfer, Opladen, Germany, assignors to Farbenfabriken Bayer Aktiengesellschaft, Leverkusen, Germany, a German corporation
No Drawing. Filed Mar. 12, 1963, Ser. No. 264,716
Claims priority, application Germany, Mar. 15, 1962, F 36,280
16 Claims. (Cl. 260—949)

The present invention relates to and has as its objects new and useful insecticidally active phosphorous containing compounds. More specifically this invention is concerned with phosphoric acid esters, ester amides or ester diamides of the general formula

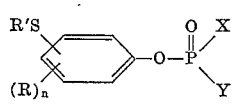

In the aforesaid formula R and R' stand for lower alkyl radicals preferably with 1 to 4 carbon atoms and X and Y for the same or different alkoxy, amino, alkylamino, or dialkylamino groups, while $n$ is a whole number from 2 to 4. In accordance with the present invention it has been found that compounds of the structure as given above are obtained, if O,O-dialkylphosphoric acid ester halides or O-alkylphosphoric acid amide or phosphoric acid diamide halides are reacted with the corresponding alkyl - substituted alkylmercaptophenols preferably in the presence of acid-binding agents.

As has been further found, the phosphoric acid derivatives according to the present invention, on the other hand, may also be obtained from alkyl-substituted O-(alkylmercaptophenyl)-phosphoric acid dichlorides. For this purpose the said O-phenyl-phosphoric acid dichlorides are reacted, optionally in the presence of acid-binding agents, with preferably lower alcohols, ammonia or alkyl- or dialkylamines. In the reaction with amines an excess of the latter can serve as acid-binding agent.

It is moreover possible, to perform the process stepwise, by first reacting e.g. the above-mentioned substituted O-phenyl-phosphoric acid dichlorides with one mol of ammonia or of an alcohol or an alkyl-substituted amine, and further reacting the intermediate product obtained with a further mol of ammonia, alcohol or amine. It is not necessary to isolate in substance the alkyl-substituted O-(alkylmercaptophenyl) - O - alkylphosphoric acid ester chlorides or -phosphoric acid ester (alkyl- or dialkyl) amide chlorides resulting as intermediate products.

The reaction according to the process is in general performed in an inert organic solvent. Lower aliphatic ketones (e.g. acetone, methyl ethyl ketone) or optionally chlorinated aliphatic or aromatic hydrocarbons have proved most valuable for this purpose. One can also operate, however, in an aqueous two-phase system. The reaction temperature is variable within wide limits, but lies expediently between 0 and 100° C.

The alkyl-substituted O-(alkylmercaptophenyl)-phosphoric acid dichlorides needed as starting materials for the last mentioned variant of the process, can be obtained according to known methods by reaction of the corresponding alkyl-alkyl-mercaptophenols with phosphorous oxychloride.

The inventive products are in part viscous, substantially water-insoluble colorless to brown-yellow coloured oils, but partly occur also in the form of crystalline substances of sharp melting point which can easily be further purified by recrystallisation from the usual solvents.

The compounds according to the invention are distinguished by outstanding pesticidal properties and therefore they are valuable pest combating agents with a wide range of activity which besides an excellent insecticidal and acaricidal activity, also show an ovicidal, nematodicidal and termite-combating effect.

The new compounds of the present invention very effectively kill insects like aphids, spider mites, caterpillars, flies etc. They distinguish themselves especially by a good contact-insecticidal activity and mostly also by a systemic action. At the same time they have an activity on eating insects such as caterpillars. Most surprisingly they are of remarkable low toxicity against mammals. They may be used in the same manner as other known phosphoric insecticides, i.e. in a concentration from about 0,00001% to about 1%, diluted or extended with suitable/solid or liquid carriers or diluents. Examples of such solid carriers are talc, chalc, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae

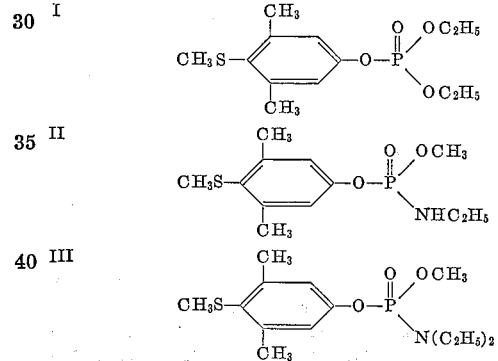

have been tested against aphids, spider mites (compounds I, II and III) and flies (compound I).

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate (in percent) |
|---|---|---|
| I | 0.01 | 90 |
|  | 0.1 | 100 |
| II | 0.01 | 100 |
| III | 0.01 | 100 |

(b) Against spider mites: bean plants (*Phasolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days.

The following results have been obtained:

| Compound | Aqueous concentration (in percent active ingredient/water) | Killing rate (in percent) |
|---|---|---|
| I | 0.001 | 95 |
|   | 0.1 | 100 |
| II | 0.001 | [1] 80 |
| III | 0.01 | [1] 100 |

[1] Ovicidal action.

(c) Again flies: about 50 flies (Drosophila) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| I | 0.01 | 100 |

Since the products, as already mentioned above, possess only a small toxicity to warm blooded animals, they also can be considered for application in veterinary medicine, e.g. for combating ecto-parasites, such as ticks.

The following examples illustrate the invention as claimed:

*Example 1*

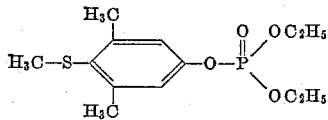

50.5 g. of 3,5-dimethyl-4-methylmercaptophenol are dissolved in 250 ml. of benzene. This solution is mixed with 135 ml. of a 2.23 normal methanolic sodium methylate solution and the methanol and benzene is then distilled off—finally in a vacuum at a bath temperature of 160° C. maximum. The remaining sodium salt of the abovementioned phenol is dissolved at 50° C. in 210 ml. of anhydrous methyl ethyl ketone, and to this solution 53 g. of O,O-diethyl phosphoric acid chloride are added dropwise at 50° C. with external cooling. The reaction mixture is then boiled for a further hour under reflux and the solvent is removed by distillation in a vacuum. The remaining residue is taken up in 400 ml. of benzene. The benzenic solution is washed with water, 1 N sodium hydroxide solution, and again with water and dried over sodium sulphate. After distilling off the benzene, the O,O-diethyl-O-(3,5-dimethyl-4-methylmercaptophenyl)-phosphoric acid ester is obtained by distillation of the residue in a high vacuum, where it distils under a pressure of 0.001 mm. Hg at 135° C. The yield amounts to 68.5 g. On rats per os the compound possesses a mean toxicity ($DL_{50}$) of 85 mg. per kg. animal weight. 0.01% solutions of the preparation kill flies (Drosophila) in 24 hours to the extent of 100% and aphids (*Doralis fabae*) within the same time, to the extent of 90%. By using solutions of the same concentration against spider mites (*Tetranychus telarius*) the killing rate after 48 hours amounts to 95%. With 0.1% solutions of the ester flies, aphids, spider mites and flour moths can be destroyed to the extent of 100%. The systemic effect of the compound against aphids of the species *Sitobium granarium* still amounts to 90% after 8 days.

*Example 2*

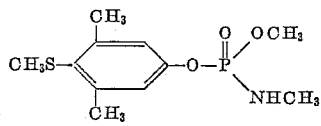

To a solution of 57 g. (0.2 mol) of O-(3,5-dimethyl-4-methylmercaptophenyl)-phosphoric acid dichloride in 200 ml. of methylene chloride, a mixture of 6.4 g. of methanol and 25 ml. of methylene chloride is added dropwise at 20 to 30° C. and the reaction mixture is then stirred at room temperature for 20 hours. Subsequently for the purpose of removing the hydrogen chloride formed, nitrogen and then, at 5 to 15° C., methylamine, are passed into the mixture and the latter is further stirred for 2 to 4 hours at 25 to 30° C. to complete the reaction. The methyl ammonium hydrochloride which precipitates is brought into solution by addition of water and the organic phase is washed with water until it gives a neutral reaction. After drying the methylene chloride solution over sodium sulphate, the solvent is distilled off in a vacuum. There remain 44 g. (80% of the theoretical yield) of the N-methylamidophosphoric acid-O-methyl-(3,5-dimethyl-4-methylmercapto-phenyl-)ester in the form of a yellow oil.

Spider mites are killed to 90% by 0.01% solutions of the compound, termites to 100% by 0.05% solutions. When administered in a concentration of 0.1% the preparation is 100% systemically effective.

*Example 3*

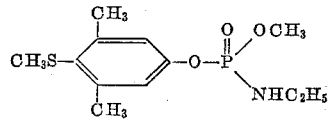

42.75 g. of O-(3,5-dimethyl-4-methylmercaptophenyl)-phosphoric acid dichloride are reacted in the same manner as described in Example 2 with methanol. To the solution of O-methyl-O-(3,5-dimethyl-4-methylmercaptophenyl)-phosphoric acid ester chloride obtained, there is added dropwise at 5 to 15° C. with vigorous stirring, an excess of an aqueous solution of ethylamine, the reaction mixture is further stirred for several hours at 30° C., the aqueous layer is then separated off and the organic phase is washed with water until it gives a neutral reaction. After drying the methylene chloride solution over sodium sulphate the solvent is distilled off in a vacuum. 34 g. (78.5% of the theoretical yield) of the N-ethylamidophosphoric acid-O-methyl-O-(3,5-dimethyl-4-methylmercaptophenyl-)ester are obtained as a yellow oil. On rats per os the mean toxicity ($DL_{50}$) of the compound amounts to 50 mg. per kg. of animal.

The following table gives information as to the biological activity of the ester:

| Administration against | Concentration of active agent, in percent | Killing rate of pests, in percent |
|---|---|---|
| Spider mites | 0.001 | [1] 80 |
| Aphids (contact-insecticidal activity) | 0.01 | 100 |
| Aphids (Systemic action) | 0.1 | 100 |
| Termites | 0.05 | 100 |

[1] Ovicidal activity.

*Example 4*

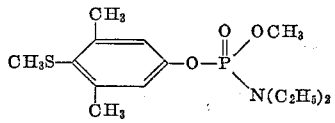

By reacting O-methyl-O-(3,5-dimethyl-4-methylmercapto-phenyl)-phosphoric acid ester chloride with diethylamine under the same conditions of reacting as described in Example 3, 37.5 g. (79% of the theoretical yield) of N,N - diethylamidophosphoric acid-O-methyl-O-(3,5-dimethyl-4-methylmercaptophenyl-)ester are obtained in the form of a brown-yellow oil. The compound exhibits the following activities when administered against various insect pests:

| Administration against | Concentration of active agent, in percent | Killing rate of pests, in percent |
| --- | --- | --- |
| Spider mites | 0.01 | [1] 100 |
| Aphids (contact-insecticidal activity) | 0.01 | 100 |
| Aphids (Systemic action) | 0.1 | 100 |
| Larvae of flies | 0.0001 | 100 |
| Termites | 0.05 | 100 |
| Ticks | 0.005 | 100 |

[1] Ovicidal activity.

*Example 5*

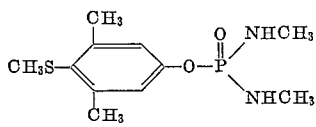

Gaseous methylamine is conducted into a solution of 28.5 g. (0.1 mol) of 3,5-dimethyl-4-methyl-mercaptophenyl-phosphoric acid dichloride (M.P. 72 to 73° C.) in benzene at 0 to 10° C. with stirring and external cooling of the mixture with ice. After the reaction is completed, the reaction mixture is further stirred for 3 hours at room temperature, the precipitated methyl ammonium hydrochloride is dissolved by the addition of water and the organic phase washed with water until it gives a neutral reaction. The mixture is then worked up in the same manner as described in the preceding examples. There remain 18.5 g. (67.5 g. of the theoretical yield) of N,N-dimethyl - diamido - phosphoric acid-O-(3,5-dimethyl-4-methylmercaptophenyl-)ester in the form of a crystalline residue of M.P. 90 to 92° C. The melting point rises no more after recrystallisation of the product from methyl cyclohexane.

We claim:
1. A compound of the formula

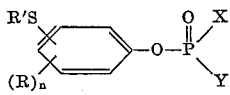

wherein R and R′ stand for lower alkyl having up to 4 carbon atoms, X stands for a member selected from the group consisting of lower alkoxy, lower alkyl amino and lower dialkyl amino, alkyl and alkoxy in each case having up to 4 carbon atoms, Y stands for a member selected from the group consisting of lower alkyl amino and lower dialkyl amino, alkyl in each case having up to 4 carbon atoms and n stands for 2.

2. The compound of claim 1 wherein R and R′ are methyl, X is lower alkoxy and Y is lower alkyl amino.
3. The compound of claim 1 wherein R and R′ are methyl, X is lower alkoxy and Y is lower dialkyl amino.
4. The compound of claim 1 wherein R and R′ are methyl, X is lower alkyl amino and Y is lower dialkyl amino.
5. The compound of claim 1 wherein R and R′ are methyl, and X and Y are lower alkyl amino.
6. The compound of claim 1 wherein R and R′ are methyl, and X and Y are lower dialkyl amino.

7. A compound of the formula

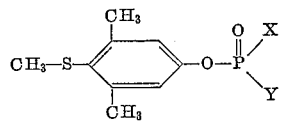

wherein X stands for a member selected from the group consisting of lower alkoxy, lower alkyl amino and lower dialkyl amino, alkyl and alkoxy in each case having up to 4 carbon atoms and Y stands for lower alkyl amino and lower dialkyl amino, alkyl in each case having up to 4 carbon atoms.

8. The compound of claim 7 wherein X is lower alkoxy and Y is lower alkyl amino.
9. The compound of claim 7 wherein X is lower alkoxy and Y is lower dialkyl amino.
10. The compound of claim 7 wherein X is lower alkyl amino and Y is lower dialkyl amino.
11. The compound of claim 7 wherein X and Y are lower alkyl amino.
12. The compound of claim 7 wherein X and Y are lower dialkyl amino.
13. The compound of the following formula

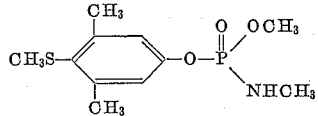

14. The compound of the following formula

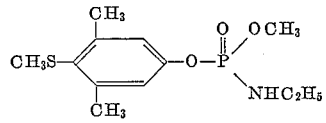

15. The compound of the following formula

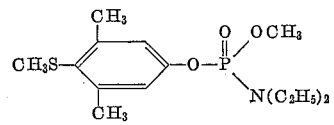

16. The compound of the following formula

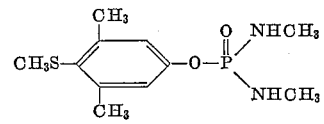

References Cited by the Examiner

UNITED STATES PATENTS

| 2,978,479 | 4/1961 | Kayser et al. | 260—461 |
| 3,042,703 | 7/1962 | Schegk et al. | 260—461 |
| 3,056,825 | 10/1962 | Schegk et al. | 260—461 |
| 3,092,544 | 6/1963 | Nault et al. | 260—461 |

OTHER REFERENCES

Fukuto et al.: "J. Agri. Food Chem.," vol. 4, pp. 930–935 (1956).

Schrader: "Angew. Chem.," vol. 73, pp. 331–334 (1961).

CHARLES B. PARKER, *Primary Examiner.*

IRVING MARCUS, *Examiner.*

F. M. SIKORA, *Assistant Examiner.*